United States Patent [19]

Lupke

[11] Patent Number: 5,582,849
[45] Date of Patent: Dec. 10, 1996

[54] TRAVELLING MOLD WITH MOLD BLOCK CARRIERS

[76] Inventor: Manfred A. A. Lupke, 92 Elgin Street, Thornhill, Ontario, Canada, L3Y 1W6

[21] Appl. No.: 239,123

[22] Filed: May 6, 1994

[51] Int. Cl.⁶ .......................... B29C 33/30; B29C 33/36
[52] U.S. Cl. .................. 425/233; 264/209.3; 264/286; 264/508; 264/568; 425/186; 425/195; 425/326.1; 425/336; 425/388; 425/392; 425/395; 425/396; 425/453
[58] Field of Search ...................... 425/186, 195, 425/233, 326.1, 335, 336, 337, 387.1, 388, 392, 395, 396, 453; 264/508, 286, 568, 209.3

[56] References Cited

U.S. PATENT DOCUMENTS

| | | | |
|---|---|---|---|
| 3,776,679 | 12/1973 | Hegler | 425/396 |
| 4,504,206 | 3/1985 | Lupke et al. | 425/233 |
| 4,787,598 | 11/1988 | Rahn et al. | 425/335 |
| 4,911,633 | 3/1990 | Comfort. | |
| 5,002,478 | 3/1991 | Lupke | 425/326.1 |
| 5,372,774 | 12/1994 | Lupke | 425/233 |

FOREIGN PATENT DOCUMENTS

| | | |
|---|---|---|
| 0087854 | 9/1983 | European Pat. Off.. |
| 0621120 | 10/1994 | European Pat. Off.. |
| 4224514 | 1/1994 | Germany. |
| 93/25373 | 12/1993 | WIPO. |

*Primary Examiner*—Jay H. Woo
*Assistant Examiner*—Joseph Leyson

[57] ABSTRACT

A travelling mold has mold blocks formed by opposing mold block sections which open and close relative to one another. The mold sections travel horizontally around a continuous track which is fitted with a plurality of side-by-side mold block carriers on which the mold block sections are releasably supported. The mold block carriers are provided with carrier gears which engage with the main drive gear of the mold so that the mold is driven by engagement of the drive gear with the carriers and not the mold block sections.

6 Claims, 5 Drawing Sheets

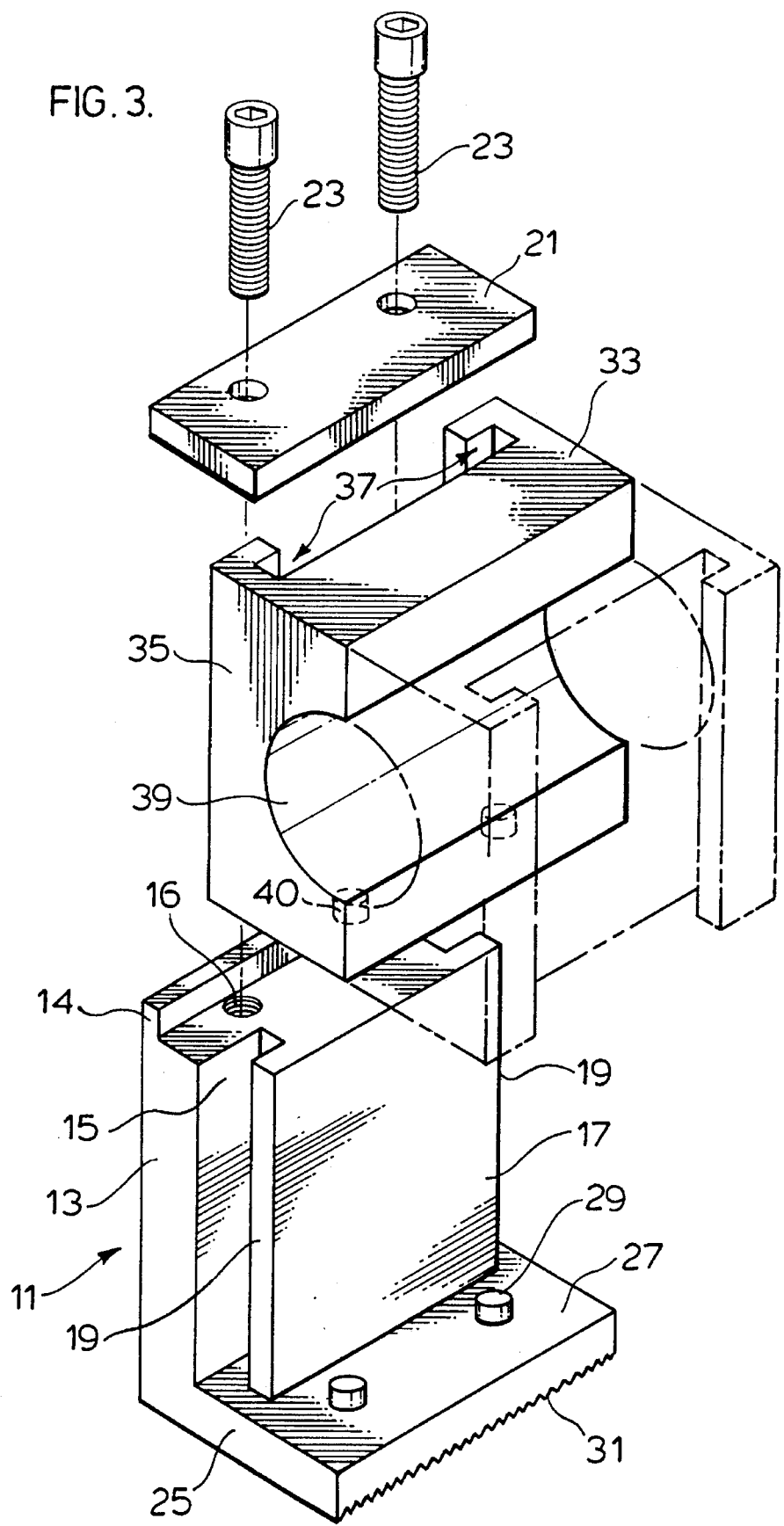

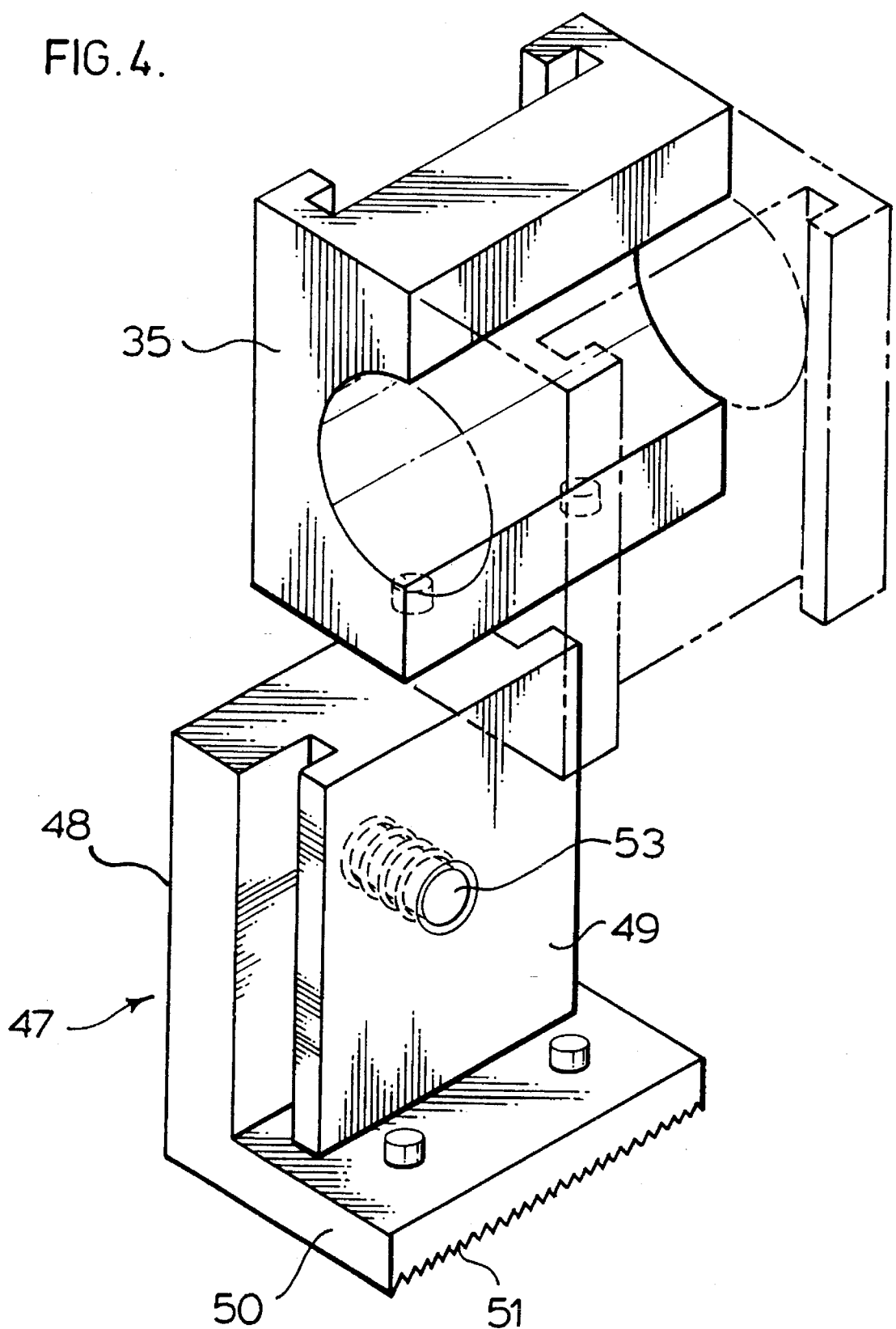

TRAVELLING MOLD WITH MOLD BLOCK CARRIERS

FIELD OF THE INVENTION

The present invention relates to a travelling mold with mold block sections releasably mounted on mold block carriers in the mold.

BACKGROUND OF THE INVENTION

A traditional travelling mold for forming plastic ribbed pipe and the like includes opposing mold block halves or sections which close with one another to form the pipe between the sections. The mold block sections open to release the pipe after its shape has been set.

In one known travelling mold configuration, the mold block sections are mounted in two separate endless tracks and the mold block sections move horizontally around the tracks. The mold block sections come together at what is known as the mold tunnel to form the pipe.

It is also possible to have all of the mold block sections move in a single horizontal track where facing mold block sections close along one side of the track to form the mold tunnel and where they open from one another along the other side of the track.

In horizontally travelling molds the mold block sections have a geared surface which engages a drive gear for driving the mold block sections around the track. Accordingly, each mold block section forms a link in the drive chain and this necessitates the use of side-by-side mold block sections completely around the track; otherwise the drive chain would be broken.

The mold block sections themselves are intricate in construction because of the many functions that they must perform in making the plastic pipe. Therefore, travelling molds formed with continuous lengths of mold block sections are high in cost. Furthermore, if an individual mold block section must be removed for maintenance purposes or the like, the entire mold must be shut down until that particular mold block section is replaced which results in lower production and associated down time costs.

SUMMARY OF THE INVENTION

The present invention provides a travelling mold having a main drive gear and series of side-by-side mold block carriers each of which has a carrier gear which engages the main drive gear. The carriers are driven horizontally in a continuous track around the travelling mold and a plurality of mold block sections are releasably mounted to the mold block carriers.

In accordance with the present invention, it is the gear of the mold block carriers and not the mold block sections themselves which engage the drive gear. Accordingly, at least some of the mold block sections may be removed from the carriers with the mold continuing to operate. Furthermore, the carriers do not have the sophisticated construction and therefore are made at a substantial cost savings in comparison to the mold block sections.

BRIEF DESCRIPTION OF THE DRAWINGS

The above as well as other advantages and features of the present invention will be described in accordance with the preferred embodiments of the present invention in which;

FIG. 3 is an exploded perspective view of an individual mold section carrier and mold section from the travelling mold shown in FIG. 2;

FIG. 4 is a perspective view of a mold section carrier and individual mold section modified from that shown in FIG. 3.

DETAILED DESCRIPTION ACCORDING TO THE PREFERRED EMBODIMENTS OF THE PRESENT INVENTION

Figure 1A:
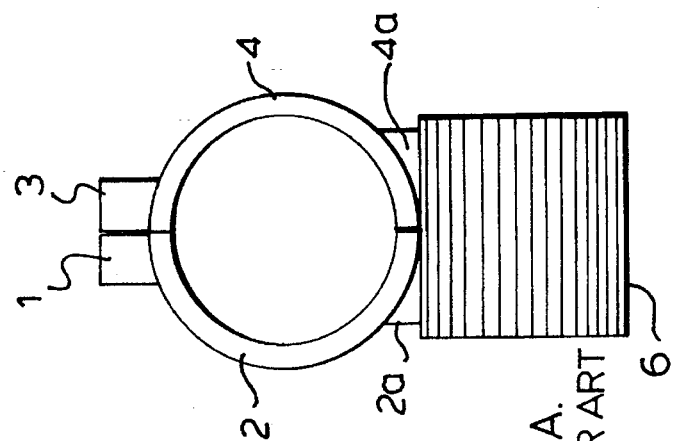
FIG. 1A a sectional view along the lines 1A—1A of the prior art mold of FIG. 1.
Figure 1:
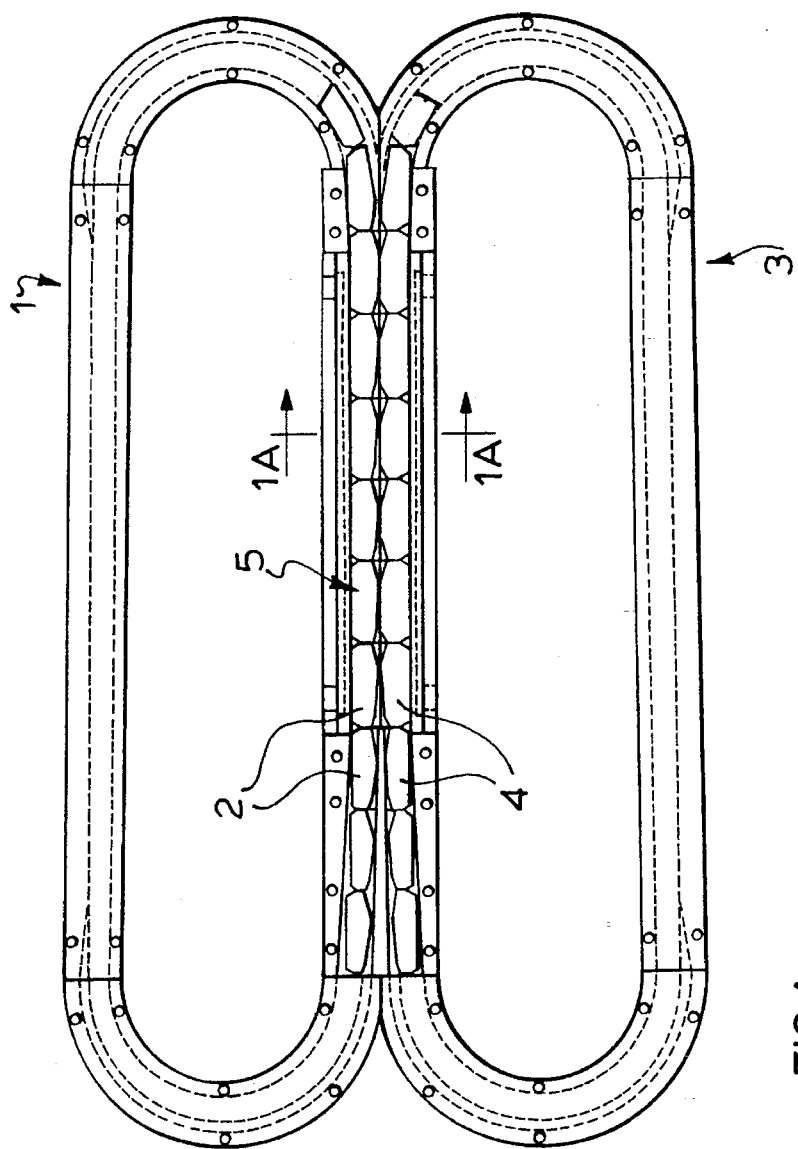
FIG. 1 is a plan view of a prior art travelling mold.

FIG. 1 shows a prior art travelling mold which is formed by a first track 1 of travelling mold block sections 2 and a second track 3 of travelling mold block sections 4. FIG. 1 as earlier described is a plan view of the mold so that it is readily understood that the mold block sections travel horizontally in their own continuous tracks. The mold block sections 2 in track 1 meet with the mold block sections 4 in track 3 in the mold tunnel or channel 5 where the two tracks are side by side with one another to form plastic pipe between the mating mold block sections. After the pipe has been formed and has had an opportunity to set, the mold block sections separate from one another and continue around their respective tracks.

As will be seen in FIG. 1A, the mold of FIG. 1 is driven by a gear G beneath the mold block sections 2 and 4. Each of these mold block sections is respectively provided with a geared undersurface $2a$ and $4a$ which meshes with the drive gear 6.

The drive gear picks up the mold block sections one at a time to push the downstream mold block sections around the track. Accordingly, this prior art travelling mold requires a complete unbroken chain of mold block sections in each of the tracks to provide a continuous drive. If the chain is broken by leaving out even one of the mold block sections, then the remainder of the mold block sections will stop as soon as the gap in the chain reaches the drive gear.

The drawback with the prior art mold above is that each individual mold block section is very costly due to the numerous functional requirements that must go into its construction, e.g. interior ribbing profiles, air channels, section to section interlocks etc. etc.. Accordingly, the more mold block sections required in order to complete the chain around the track, the higher the cost of the mold. Furthermore, if any one of the mold block sections needs to be removed from the chain for maintenance purposes or the like, the entire mold must be shut down.

Figure 2:
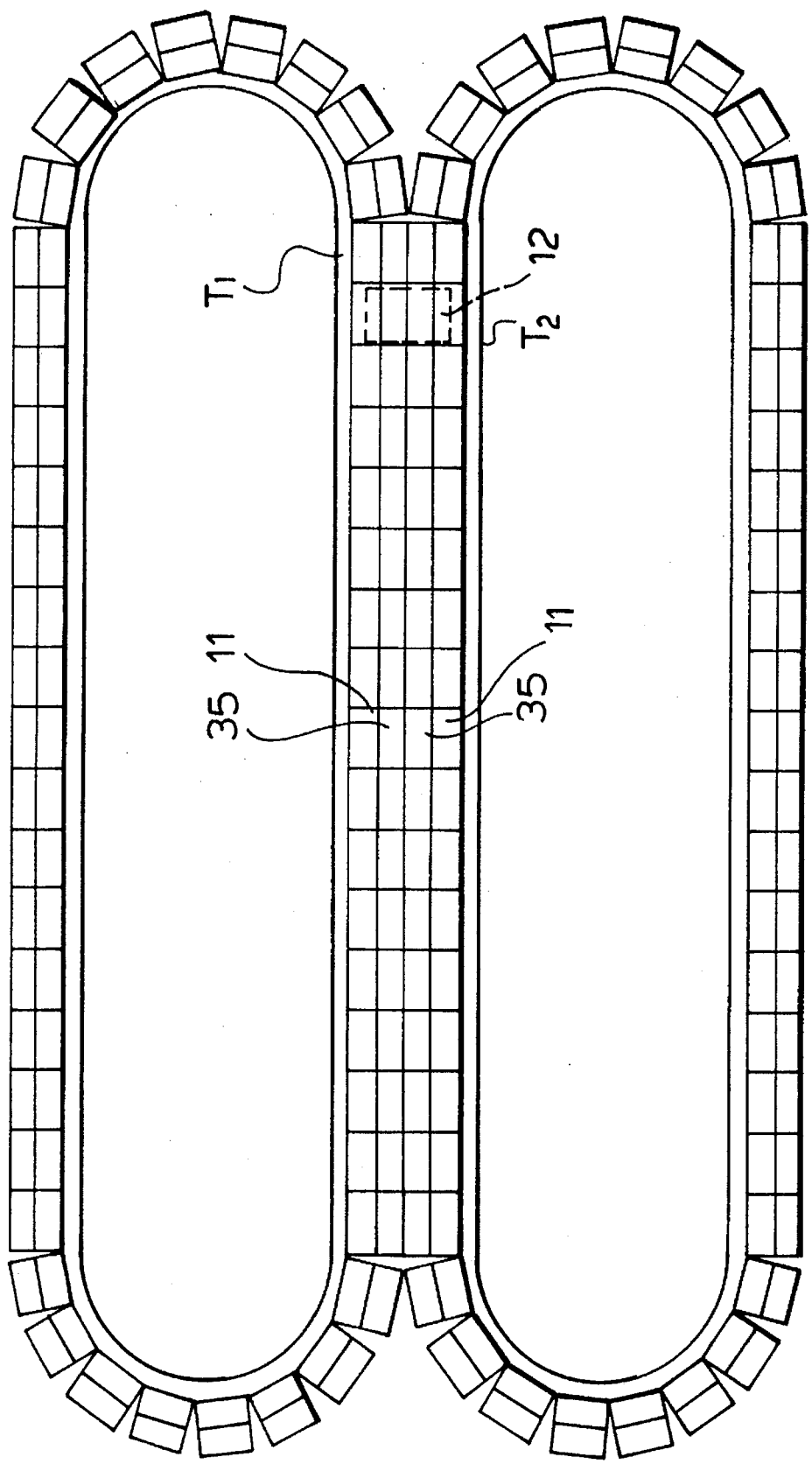
FIG. 2 is a plan view of a travelling mold in accordance with a preferred embodiment of the present invention.
Figure 2A:
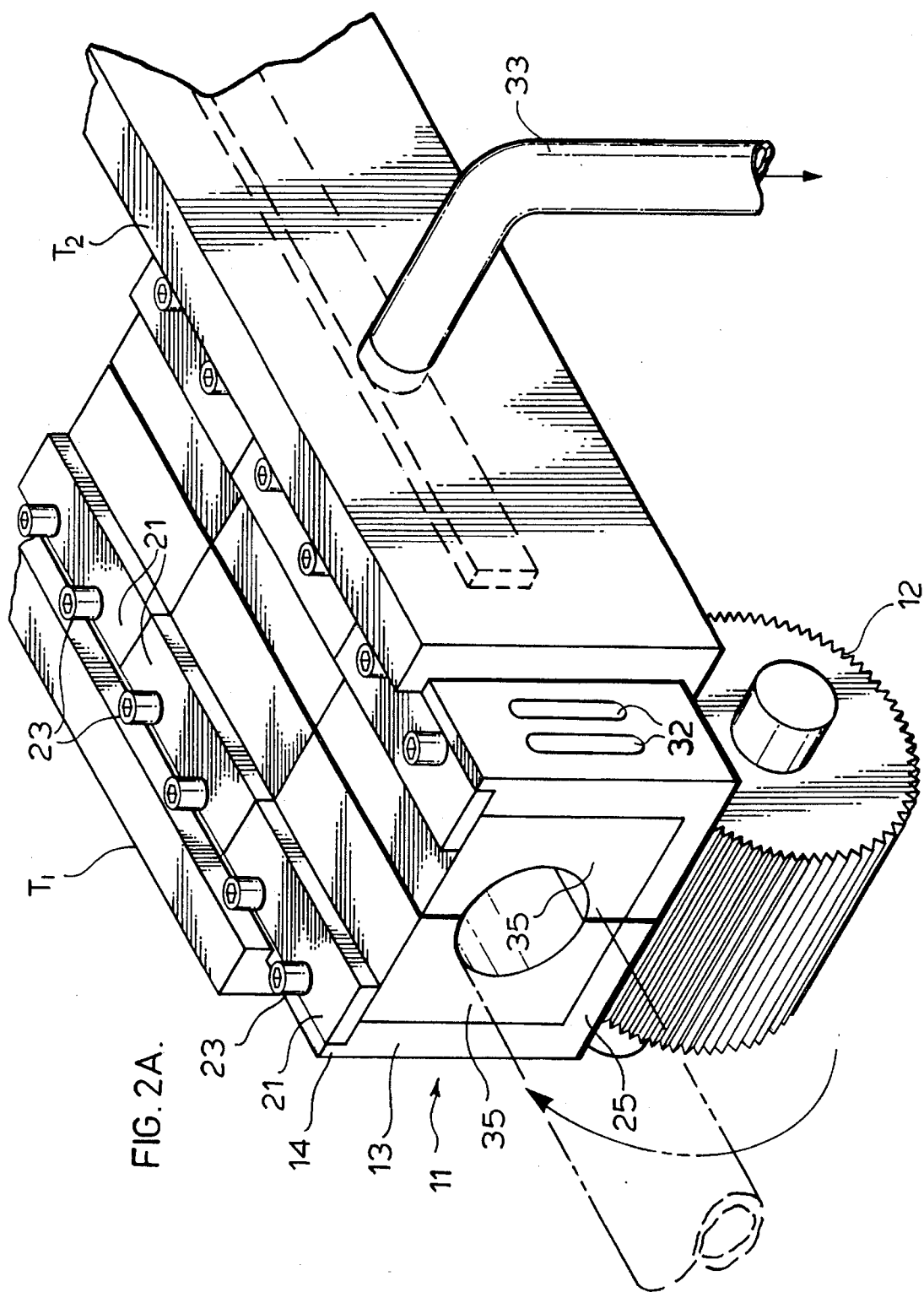
FIG. 2A is a perspective view through the mold tunnel from the mold of FIG. 2.

FIG. 2 of the drawings is a plan view of a mold in accordance with the present invention in which a series of mold block sections 35 are releasably mounted in carriers 11 slidable around a pair of side-by-side tracks T1 and T2. The carriers form a continuous chain in each of the tracks A drive gear 12 drives the carriers in tracks T1 and T2 as best shown in FIG. 2A of the drawings.

Each of the carriers 11 comprises a main vertical backing 13 and a smaller interior facing 17 presenting outer shoulders 19. These shoulders are separated from the main backing 13 by vertical channels 15. As seen in FIG. 3 of the drawings, shoulders 19 on the interior facing 17 do not extend out as far as the outer shoulders on the backing 13.

A horizontal support platform 25 is provided at the base of the carrier. The upper surface 27 of the support platform is provided with raised lugs 29. The support platform 25 is provided with a geared undersurface 31.

Mold block section 35 slides vertically on and off of carrier 11. The carriers are set up such that the track in which they ride do not interfere with removal of the mold block sections. Each section 35 includes a pair of undercut recesses 37 which receive the shoulders 19 of the interior facing 17 of the carrier. It is important to note that because the interior face 17 is narrower than the rear backing 13 of the carrier the outer edges at opposite sides of the mold block section are flush or level with the outside edges at both sides of the carrier. Therefore, the mold block sections do not interfere with the side-by-side fitting of the carriers and further the mold block sections themselves abut flushly with one another when they are mounted on side by side carriers.

Mold block section 35 further includes lug receiving openings 40 on its undersurface and these openings drop down over the lugs 29 on the support platform of the carrier.

In the particular arrangement shown in FIG. 3, a mounting plate 21 of the carrier sits atop the mold block section and is secured in position by bolts 23 which thread into openings 16 on the outside wall of the carrier. Plate 21 prevents any unwanted upward shifting of the mold block section.

The plate 21 does not cover the entire upper surface of carrier 11 and the vertical backing 13 of the carrier includes a raised shoulder 14 behind plate 21. Shoulder 14 is trapped in the track whereas plate 21 and the mold block section can be removed from the track.

FIG. 4 of the drawings shows a modified mold block section carrier 47. This carrier like the earlier carrier has a vertical backing 48 and a narrower interior facing 49 with a vertical slide channel being defined between backing 48 and facing 49. Carrier 47 also includes a lower support platform 50 having a geared undersurface 51.

Rather than having a locking plate securing system for locking the mold block section to the carrier, carrier 47 includes a spring loaded detente 53 which has a cammed outer surface allowing mold block section 35 to slide down over the detente. However, the spring loading of the detente applies sufficient pressure on the mold block section to prevent it from rising under normal operating conditions of the mold.

When using the carrier of FIG. 4, the track grips the upper surface of the carrier outside of the mold block section so that the mold block section can be lifted off of the carrier while it is supported in the track by the carrier.

What is consistent between the carriers of FIGS. 3 and 4 is that in both instances the mold block sections are removable from the carrier without having to remove the carrier itself from the track. In the particular embodiments shown, the mold block sections slide vertically on and off of the carriers.

Another feature of the carriers is that they include openings 32 which open to air passages through the mold blocks for vacuum forming of the plastic pipes. The draw for the vacuum is provided along air draw tube 33.

The drawings show a plurality of side-by-side air draw openings through the mold block carrier which allows different areas of air draw to the rib forming channels in the mold block sections. As shown in FIG. 2A, the air draw openings can be vertical in that they extend in the vertical direction. The carrier can also be provided with a single opening which draws air over the entire length of the carrier.

Pipes made using the mold block sections and carriers of the present invention can be formed by blow molding equally as well as the above described vacuum forming.

As will be appreciated from the drawings as well as the earlier description, the movement of the mold is provided by the contact between the drive gear 12 and the geared undersurfaces of the carriers 11. Accordingly, even if some of the mold block sections are removed from the mold, the chain of carriers remains complete for driving the mold. Removal of an individual mold block section is easily accomplished because it simply slides up and off of the carrier without having to remove the carrier from the track.

The drawings show a travelling mold using side by side mold tracks with mold block sections mounted in each track. The travelling mold also operates using a single horizontal track with facing mold block sections mounted together on one carrier. The facing mold block sections which are once again removable from the carrier close with one another on one side of the track to form the mold tunnel and then open up to release pipe formed in the mold tunnel.

A horizontally travelling mold in accordance with the present invention with mold block sections releasably mounted on carriers can provide substantial cost savings from both a material and a labour standpoint relative to a conventional horizontally travelling mold requiring a continuous chain of mold block sections around the mold.

Although various preferred embodiments of the present invention have been described herein in detail, it will be appreciated by those skilled in the art that variations may be made without departing from the spirit of the invention or the scope of the appended claims.

The embodiments of the invention in which an exclusive property or privilege is claimed are defined as follows:

1. A travelling mold comprising moving mold block sections mounted on a carrier line which slides through a guide track with said guide track being formed as a continuous horizontal loop including a molding section wherein said mold block sections form a mold tunnel, said carrier line comprising a plurality of individual carrier members to which said mold block sections are releasably secured, each carrier member having a geared undersurface and said mold having a drive gear beneath said carrier line positioned to engage with and push on the geared undersurfaces of said carrier members as they pass over said drive gear, said carrier members being in side by side abutment with one another throughout said track such that said drive gear only needs to push on said carrier members one at a time, either with or without said mold block sections mounted thereon, to force said carrier line completely around said track.

2. A travelling mold as claimed in claim 1, wherein said track positively secures said carrier members against upward lifting from said track with said mold block sections being free of said track and releasable vertically of said carrier members.

3. A travelling mold as claimed in claim 2, wherein said carrier members include outside edges which are gripped by said track to block said carrier members from lifting vertically from said track, said mold block sections being spaced inwardly from said outside edges of said carrier members and said track being open from above to allow for the vertical releasing of said mold block sections from said carrier members and said track.

4. A travelling mold as claimed in claim 3, including a vertical sliding interlock between said mold block sections and said carrier members.

5. A travelling mold as claimed in claim 1, wherein said carrier members are provided with air passages and said track includes an outer sidewall with an air feed through said outer sidewall to said air passages of said carrier members.

6. A travelling mold as claimed in claim 5, wherein said air passages comprise a plurality of side by side vertical air channels in each carrier member.

* * * * *